A. W. SANDELIN.
COMBINED RULE AND PROTRACTOR.
APPLICATION FILED JUNE 21, 1909.

981,598.

Patented Jan. 10, 1911.

Witnesses
I. E. Strobel
L. N. Gillis

Inventor
ALFRED W. SANDELIN,

Attorney

500
UNITED STATES PATENT OFFICE.

ALFRED W. SANDELIN, OF MINNEAPOLIS, MINNESOTA.

COMBINED RULE AND PROTRACTOR.

981,598.                Specification of Letters Patent.        Patented Jan. 10, 1911.

Application filed June 21, 1909. Serial No. 503,505.

*To all whom it may concern:*

Be it known that I, ALFRED W. SANDELIN, a citizen of the United States, residing at Minneapolis, in the county of Hennepin, State of Minnesota, have invented certain new and useful Improvements in Combined Rules and Protractors; and I do hereby declare the following to be a full, clear, and exact description of the invention, such as will enable others skilled in the art to which it appertains to make and use the same.

This invention relates to measuring instruments and has special reference to a form of folding rule provided with a novel species of joint so arranged as to indicate the angle of opening of the rule.

The invention still more specifically refers to a folding rule provided with a protractor around the axis thereof together with an improved form of indicator therefor.

In the ordinary form of rule which has a protractor at the center joint much difficulty is experienced in obtaining true angles for the reason that no indicator other than the rule joint end is provided and in order to get a true indication it is necessary that the protractor division be brought truly into alinement therewith. Experiment shows that this is almost impossible to accomplish and the principal object of the present invention is to provide a form of indicator which will not interfere with the general construction of a rule of this character but which, at the same time, will be of such nature as to make it extremely easy to properly "set" the rule for any angle.

Another difficulty that has been experienced in the usual form of rule arises from the fact that after the rule has been used for some time the joint ends become more or less bruised with the consequence that the value of one of these ends as an index is eliminated so that the protractor feature of the rule becomes useless.

Another object of the present invention is to obviate this difficulty by providing an index the edge of which is not subject to bruising and wear so that its value for the purpose remains constant.

With the above and other objects in view the invention consists in general of a pair of members connected by a rule joint, one of said members having its joint end provided with a protractor and the other with an improved and novel form of index.

The invention further consists in certain novel details of construction and combinations of parts hereinafter fully described, illustrated in the accompanying drawings, and specifically set forth in the claim.

Figure 1:
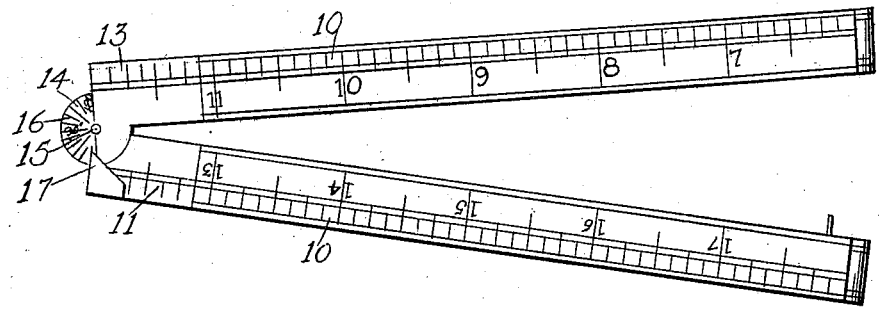
Figure 2:
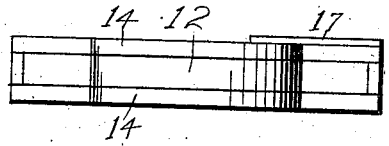
Figure 2:

In the accompanying drawings, like characters of reference indicate like parts in the several views, and:—Figure 1 indicates a rule having the joint constructed in accordance with this invention. Fig. 2 is an end view of the joint.

The numeral 10 indicates the center joints of a rule which in the present instance is indicated as an ordinary two foot rule. One of these members 10 is provided with a joint end 11 having a projection in the form of ¾ of a circle and this projection is reduced in thickness from the thickness of the rule body as clearly shown in Fig. 2 at 12. The other member 10 has a joint end 13 provided with a projection similar in form to the projection 12, but in this instance the projection comprises a pair of spaced members 14. The member 12 lies between the members 14 and a pivot pin 15 passes through the centers of these members thus constituting what is commonly known as a rule joint. Upon the outer face of one of these spaced members 14 are protractor divisions 16. Secured to the rule end 11 and in such manner that it projects over the divided member 14 is an index plate 17. This index plate has one edge so arranged as to be truly radial from the center of the joint and the inner edge of the plate lies at an acute angle to the first mentioned edge so that a small sharp point is formed which acts as an index for the protractor scale. By reason of this plate lying upon the member 14 the point is at no time subject to wear or injury so that its value as an index is not subject to diminution. It is to be noted that by reason of the peculiar position of the plate 17 it serves the double function of a pointer or index and a protractor for the end edge of the scale so that the corner of the member to which the pointer is attached does not readily become worn. Furthermore, the point projects sufficiently far over the member 14 that any one of the division lines marked on that member may be readily adjusted by bringing it up until it is cut in two by the radial edge of the index adjacent its point.

It will be noted from the foregoing that the objects sought to be accomplished have been achieved and that there has thus been provided a simple and efficient device of the kind described and for the purpose specified.

Having thus described the invention, what is claimed as new, is:—

The combination with a rule joint comprising pivoted members one of which is provided with a face having protractor divisions thereon; of an index comprising a relatively thin plate having one edge supported on the face of the other member, said plate having the end edge flush with the end of the member whereon it is supported and radial to the center of the rule joint, said end edge extending to the corner of the supporting member and protecting the end of said supporting member, the inner edge of said plate lying at an acute angle to the first mentioned edge whereby an index point is formed, said index point being arranged to project over the protractor divided face of the first member.

In testimony whereof, I affix my signature, in presence of two witnesses.

ALFRED W. SANDELIN.

Witnesses:
C. E. JOHNSON,
JACOB BROWN.